United States Patent
Tirelli et al.

(10) Patent No.: US 7,652,101 B2
(45) Date of Patent: Jan. 26, 2010

(54) THERMOPLASTIC MATERIAL COMPRISING A VULCANIZED RUBBER IN A SUBDIVIDED FORM

(75) Inventors: Diego Tirelli, Milan (IT); Michele Galbusera, Milan (IT); Luca Castellani, Milan (IT); Franco Peruzzotti, Milan (IT); Enrico Albizzati, Milan (IT)

(73) Assignee: Pirelli & C. S.p.A., Milan (IT)

( * ) Notice: Subject to any disclaimer, the term of this patent is extended or adjusted under 35 U.S.C. 154(b) by 423 days.

(21) Appl. No.: 10/551,186

(22) PCT Filed: Mar. 31, 2003

(86) PCT No.: PCT/EP03/03336

§ 371 (c)(1),
(2), (4) Date: Jul. 7, 2006

(87) PCT Pub. No.: WO2004/087803

PCT Pub. Date: Oct. 14, 2004

(65) Prior Publication Data

US 2007/0135580 A1    Jun. 14, 2007

(51) Int. Cl.
*C08L 9/00* (2006.01)
*C08L 23/04* (2006.01)
*C08L 23/10* (2006.01)
*C08L 23/16* (2006.01)

(52) U.S. Cl. .................. 525/86; 525/191; 525/232; 525/240

(58) Field of Classification Search .............. 525/70, 525/86, 191, 232, 240
See application file for complete search history.

(56) References Cited

U.S. PATENT DOCUMENTS

| | | |
|---|---|---|
| 4,818,785 A * | 4/1989 | Otawa et al. ............. 524/576 |
| 5,010,122 A | 4/1991 | Koski |
| 5,157,082 A | 10/1992 | Johnson |
| 5,286,564 A | 2/1994 | Cecchin et al. |
| 5,798,413 A | 8/1998 | Spelthann et al. |
| 5,889,119 A | 3/1999 | Coran et al. |
| 6,015,861 A | 1/2000 | Mertzel et al. |
| 6,031,009 A * | 2/2000 | Gonzalez ................ 521/41 |
| 6,262,175 B1 | 7/2001 | Jury et al. |
| 6,476,117 B1 * | 11/2002 | Wang et al. ............. 524/504 |

FOREIGN PATENT DOCUMENTS

| | | |
|---|---|---|
| EP | 0 373 660 | 6/1990 |
| EP | 0 400 333 | 12/1990 |
| WO | WO 00/78852 | 12/2000 |
| WO | WO 02/24795 | 3/2002 |

* cited by examiner

*Primary Examiner*—Nathan M Nutter
(74) *Attorney, Agent, or Firm*—Finnegan, Henderson, Farabow, Garrett & Dunner, L.L.P.

(57) ABSTRACT

A thermoplastic material has a) from 5% weight to 95% by weight, preferably from 10% by weight to 60% by weight, of vulcanized rubber in a subdivided form; b) from 5% by weight to 95% by weight, preferably from 40% by weight to 90% by weight, of at least one heterophase copolymer having a thermoplastic phase made from a propylene homopolymer or copolymer and an elastomeric phase made from a copolymer of ethylene with an α-olefin, preferably with propylene; c) from 0% by weight to 90% by weight, preferably from 0% by weight to 50% by weight, of at least one α-olefin homopolymer or copolymer different from b); the amounts of a), b) and c) being expressed with respect to the total weight of a)+b)+c). The thermoplastic material shows improved mechanical properties, in particular, improved elongation at break.

44 Claims, No Drawings

THERMOPLASTIC MATERIAL COMPRISING A VULCANIZED RUBBER IN A SUBDIVIDED FORM

CROSS REFERENCE TO RELATED APPLICATION

This application is a national phase application based on PCT/EP2003/003336, filed Mar. 31, 2003, the content of which is incorporated herein by reference.

BACKGROUND OF THE INVENTION

1. Field of the Invention

The present invention relates to a thermoplastic material comprising a vulcanized rubber in a subdivided form.

In particular, the present invention relates to a thermoplastic material comprising a vulcanized rubber in a subdivided form and at least one heterophase copolymer comprising a thermoplastic phase made from a propylene homopolymer or copolymer and an elastomeric phase made from a copolymer of ethylene with an α-olefin.

The present invention moreover relates to a manufactured product comprising said thermoplastic material.

2. Description of the Related Art

The increased production of industrial rubber products has resulted in the accumulation of large amounts of rubber wastes which per se do not find any practical applications and are generally disposed in dedicated landfills with the main drawbacks of environment pollution as well as of the need for large dedicated areas for storing said wastes.

It is known in the art to depolymerize waste stream of rubber, such as tyres, in an effort to reduce the volume of waste and obtain a useful byproduct. Likewise, rubber product may be devulcanized in an attempt to recycle the waste rubber.

In addition to these techniques, it is common in the art to grind the waste streams of rubber and utilize the ground particles so obtained. These ground particles are then typically compounded with other polymeric materials in order to make final product which may be employed in a plurality of applications.

However, it has been found that the addition of such ground rubber particles to the polymeric material results in a significant deterioration of the mechanical properties of the resulting polymeric composites.

Many efforts have been made in the art in order to overcome the above reported problems.

For example, patent U.S. Pat. No. 5,010,122 relates to thermoplastic compositions comprising rubber particulate having a size less than about 10 mesh, a thermoplastic material, and at least one coupling agent. The thermoplastic material preferably comprises an olefin, a co-polymer of an olefin, a homopolymer of an olefin, or blends thereof. The coupling agent preferably comprises a silane coupling agent. The abovementioned thermoplastic compositions are said to have excellent physical properties.

Patent U.S. Pat. No. 5,157,082 relates to thermoplastic compositions comprising mixtures of ground vulcanized rubber, polyolefin resin, and at least one functionalized olefin polymer which may be selected from a copolymer of at least one olefin and at least one ethylenically unsaturated organic monomer. The polyolefin resin is a solid, high molecular weight polymeric material made by polymerizing one or more olefinic monomers in a conventional manner. Preferred polyolefin resins are polyethylene or polypropylene. Also suitable for the practice of the invention are copolymers of two or more olefins with copolymers of ethylene and propylene being preferred. The abovementioned thermoplastic compositions are said to have improved mechanical properties.

Patent U.S. Pat. No. 5,889,119 relates to a thermoplastic rubbery composition comprising (I) from about 10 to about 40 parts by weight of a low-modulus binder including: (a) from about 75 to about 25 parts by weight of a crystalline polyolefin resin, and (b) from about 25 to about 75 parts by weight of a binder rubber in the form of particles having an average diameter of less than about 20 µm, said binder rubber having been dynamically vulcanized; and (II) from about 90 to greater than 50 parts by weight of ground vulcanized rubber particles having an average diameter in the range of from about 50 µm to about 1.2 mm. The polyolefin resins are preferably high density polyethylene or polypropylene. The abovementioned thermoplastic rubbery composition is said to have improved physical properties.

U.S. Pat. No. 6,015,861 relates to a method of preparing a rubber-blend thermoplastic composition, comprising the steps of: (a) providing a ground crosslinked rubber having an average particle size of about 80 mesh or smaller; and (b) combining the ground crosslinked rubber with a thermoplastic polyolefinic material and a compatibilizer based on a paraffinic oil to form a blend thermoplastic resin composition. The preferred thermoplastic polyolefinic material are polyethylene, polypropylene, ethylene copolymers, propylene copolymers, poly(ethylene propylene)copolymers, and mixtures thereof. The composition prepared by the abovementioned method is said to include a surprisingly high level of recycle rubber without adverse effect on its physical or aesthetic properties.

U.S. Pat. No. 6,031,009 relates to thermoplastic compositions comprising a blend of ground vulcanized rubber, at least one conventional olefin polymer and at least one metallocene single site catalyzed α-olefin copolymer. The olefin polymer is a solid, high molecular weight polymeric material made by polymerizing one or more olefinic monomers in a conventional manner. Preferred olefin polymers are polyethylene or polypropylene. The abovementioned thermoplastic compositions are said to have improved mechanical properties.

International Patent Application WO 00/78852 relates to a method for producing an elastomeric alloy similar to thermoplastic elastomers using reclaimed or waste rubber. To this end, a polypropylene copolymer or a mixture thereof with at least one polypropylene type, is melted in a mixer. Subsequently, powdered rubber, at least a part of which is pre-swollen in a radical donor, is added to the melt in a metered quantity, the powdered rubber is dispersed in the plastic matrix by applying high shear forces whilst adding radical-forming agents in accordance with defined mixing parameters to produce a phase coupling between the powdered rubber and the polypropylene copolymer or a mixture thereof. The obtained elastomeric alloy is said to have properties similar to thermoplastic elastomers.

U.S. Pat. No. 6,262,175 relates to a thermoplastic composition containing, in percentages by weight based on the total weight of the composition: about 5% to about 90% of vulcanized rubber crumb; about 5% to about 60% polyolefin; about 2% to about 30% uncured rubber or styrene-based thermoplastic elastomer; and about 2% to about 30% vinyl polymer selected from vinyl homopolymers, copolymers and mixtures thereof. The polyolefin is a solid, high molecular weight polyolefin homopolymer or copolymer, or mixtures thereof. Preferred polyolefin are polyethylene, polypropylene, or a copolymer of ethylene and propylene. The abovementioned thermoplastic composition is said to have excellent physical properties, including excellent ultimate elongation and tear strength.

International Patent Application WO 02/24795 relates to a method for recycling a thermoset rubber material comprising subjecting a recycled thermoset rubber material to a phase compatibility treatment with an oxidizing agent and blending the recycled thermoset rubber material with a thermoplastic polymer to obtain a material selected from the group consisting of a thermoplastic elastomer and an impact-strengthened thermoplastic. Polyolefins (e.g. polypropylene) are among the more preferred thermoplastic polymers.

SUMMARY OF THE INVENTION

The Applicant noticed that compatibility problems between the vulcanized rubber in a subdivided form and the thermoplastic polymers, in particular in the case of polypropylene and its copolymers, still exhist notwithstanding the efforts of the prior art. Said compatibility problems negatively affect the mechanical properties of the obtained thermoplastic material.

The Applicant has now found that it is possible to overcome the above mentioned problems utilizing, as a thermoplastic polymer, a heterophase copolymer comprising a thermoplastic phase made from a propylene homopolymer or copolymer and an elastomeric phase made from a copolymer of ethylene with an α-olefin. Said heterophase copolymer shows an improved compatibility with the ground vulcanized rubber and allows to obtain a thermoplastic material having good mechanical properties, in particular elongation at break, stress at break and/or impact resistance. More in particular, said thermoplastic material shows an improved elongation at break.

According to a first aspect, the present invention relates to a thermoplastic material comprising:
(a) from 5% by weight to 95% by weight, preferably from 10% by weight to 60% by weight, of a vulcanized rubber in a subdivided form;
(b) from 5% by weight to 95% by weight, preferably from 40% by weight to 90% by weight, of at least one heterophase copolymer comprising a thermoplastic phase made from a propylene homopolymer or copolymer and an elastomeric phase made from a copolymer of ethylene with an α-olefin, preferably with propylene;
(c) from 0% by weight to 90% by weight, preferably from 0% by weight to 50% by weight, of at least one α-olefin homopolymer or copolymer different from (b); the amounts of (a), (b) and (c) being expressed with respect to the total weight of (a)+(b)+(c).

For the aim of the present description and of the claims which follow, the expression "heterophase copolymer comprising a thermoplastic phase made from a propylene homopolymer or copolymer and an elastomeric phase made from a copolymer of ethylene with an α-olefin" means a thermoplastic elastomer obtained by sequential copolymerization of: (i) propylene, optionally containing small amounts of at least one olefinic comonomer selected from ethylene and α-olefins other than propylene; and then of: (ii) a mixture of ethylene with an α-olefin, in particular propylene, and optionally with small proportions of a polyene, in particular a diene. This class of products is also commonly known as "thermoplastic reactor elastomers".

DETAILED DESCRIPTION OF THE INVENTION

The vulcanized rubber in a subdivided form (a) which may be used in the present invention may be obtained by grinding or otherwise comminuting any source of vulcanized rubber compound such as, for example, tyres, roofing membranes, hoses, gaskets, and the like, and is preferably obtained from reclaimed tyres using any conventional method. For example, the vulcanized rubber in a subdivided form may be obtained by mechanical grinding at ambient temperature or in the presence of a cryogenic coolant (i.e. liquid nitrogen). Any steel or other metallic inclusions should be removed from the ground tyres before use. Since the thermoplastic material of the present invention is preferably fiber-free, all fibrous material such as, for example, tyre cord fibers, is preferably removed from the ground rubber using conventional separation methods.

According to one preferred embodiment, the vulcanized rubber in a subdivided form (a) which may be used in the present invention, is in the form of powder or granules having a particle size not higher than 10 mm, preferably not higher than 5 mm.

According to a more preferred embodiment, the vulcanized rubber in a subdivided form (a) which may be used in the present invention, has a particle size not higher than 0.6 mm, preferably not higher than 0.5 mm, more preferably not higher than 0.2 mm.

According to one preferred embodiment, the vulcanized rubber in a subdivided form (a) may comprises at least one diene elastomeric polymer or copolymer which may be of natural origin or may be obtained by solution polymerization, emulsion polymerization or gas-phase polymerization of one or more conjugated diolefins, optionally blended with at least one comonomer selected from monovinylarenes and/or polar comonomers in an amount of not more than 60% by weight.

The conjugated diolefins generally contain from 4 to 12, preferably from 4 to 8 carbon atoms, and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, or mixtures thereof.

Monovinylarenes which may optionally be used as comonomers generally contain from 8 to 20, preferably from 8 to 12 carbon atoms, and may be selected, for example, from: styrene; 1-vinylnaphthalene; 2-vinylnaphthalene; various alkyl, cycloalkyl, aryl, alkylaryl or arylalkyl derivatives of styrene such as, for example, α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, or mixtures thereof.

Polar comonomers which may optionally be used may be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile, or mixtures thereof.

Preferably, the diene elastomeric polymer or copolymer may be selected, for example, from: cis-1,4-polyisoprene (natural or synthetic, preferably natural rubber), 3,4-polyisoprene, polybutadiene (in particular polybutadiene with a high 1,4-cis content), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

Alternatively, the vulcanized rubber in a subdivided form (a) may comprise at least one elastomeric polymer of one or more monoolefins with an olefinic comonomer or derivatives thereof. The monoolefins may be selected from: ethylene and α-olefins generally containing from 3 to 12 carbon atoms, such as, for example, propylene, 1-butene, 1-pentene, 1-hexene, 1-octene, or mixtures thereof. The following are preferred: copolymers between ethylene and an α-olefin, optionally with a diene; isobutene homopolymers or copolymers thereof with small amounts of a diene, which are optionally at least partially halogenated. The diene optionally present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene, or mixtures thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

For the aim of the present description and of the claims which follows, the term "α-olefin" generally means an aliphatic α-olefin of formula $CH_2=CH-R$, wherein R represents a hydrogen atom, or a linear or branched alkyl group containing from 1 to 12 carbon atoms.

Preferably, the aliphatic α-olefin is selected from: ethylene, propylene, 1-butene, isobutylene, 1-pentene, 1-hexene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, or mixture thereof. Of these, preferred are ethylene, propylene, 1-butene, 1-hexene, 1-octene, or mixtures thereof.

For the aim of the present description and of the claims which follows, the term "polyene" generally means a conjugated or non-conjugated diene, triene or tetraene. When a diene comonomer is present, this comonomer generally contains from 4 to 20 carbon atoms and is preferably selected from: linear conjugated or non-conjugated diolefins such as, for example, 1,3-butadiene, 1,4-hexadiene, 1,6-octadiene, and the like; monocyclic or polycyclic dienes such as, for example, 1,4-cyclohexadiene, 5-ethylidene-2-norbornene, 5-methylene-2-norbornene, vinylnorbornene, or mixtures thereof. When a triene or tetraene comonomer is present, this comonomer generally contains from 9 to 30 carbon atoms and is preferably selected from trienes or tetraenes containing a vinyl group in the molecule or a 5-norbornen-2-yl group in the molecule. Specific examples of triene or tetraene comonomers which may be used in the present invention are: 6,10-dimethyl-1,5,9-undecatriene, 5,9-dimethyl-1,4,8-decatriene, 6,9-dimethyl-1,5,8-decatriene, 6,8,9-trimethyl-1,6,8-decatriene, 6,10,14-trimethyl-1,5,9,13-pentadecatetraene, or mixtures thereof. Preferably, the polyene is a diene.

As disclosed above, the heterophase copolymer (b) is prepared by sequential copolymerization of: (i) propylene, optionally containing at least one olefinic comonomer chosen from ethylene and α-olefins other than propylene; and then of: (ii) a mixture of ethylene with an α-olefin, in particular propylene, and optionally a polyene, in particular a diene. The copolymerization is usually carried out in the presence of Ziegler-Natta catalysts based on halogenated titanium compounds supported on magnesium chloride in admixture with an aluminium trialkyl compound wherein the alkyl groups contains from 1 to 9 carbon atoms such as, for example, aluminium triethyl or aluminium triisobutyl. More details regarding the preparation of the heterophase copolymer (b) are given, for example, in European Patent Applications EP 400,333 and EP 373,660 and in patent U.S. Pat. No. 5,286,564.

The thermoplastic phase of the heterophase copolymer (b), mainly produced during the abovementioned phase (i) of the process, consists of a propylene homopolymer or a copolymer of propylene with an olefinic comonomer selected from ethylene and α-olefins other than propylene. Preferably, the olefinic comonomer is ethylene. The amount of olefinic comonomer is preferably less than 10 mol % relative to the total number of monomer moles in the thermoplastic phase.

The elastomeric phase of the heterophase copolymer (b), mainly produced during the abovementioned phase (ii) of the process, is at least 10% by weight, preferably at least 40% by weight, more preferably at least 60% by weight, relative to the total weight of the heterophase copolymer, and consists of an elastomeric copolymer of ethylene with an α-olefin and optionally with a polyene. Said α-olefin is preferably propylene; said polyene is preferably a diene. The diene optionally present as comonomer generally contains from 4 to 20 carbon atoms and is preferably selected from: linear (non-)conjugated diolefins such as, for example, 1,3-butadiene, 1,4-hexadiene, 1,6-octadiene, or mixtures thereof; monocyclic or polycyclic dienes, for example 1,4-cyclohexadiene, 5-ethylidene-2-norbornene, 5-methylene-2-norbornene, or mixture thereof. The composition of the elastomeric phase is generally as follows: from 15 mol % to 85 mol % of ethylene; from 85 mol % to 15 mol % of an α-olefin, preferably propylene; from 0 mol % to 5 mol % of a polyene, preferably a diene.

Preferably, the elastomeric phase consists of an elastomeric copolymer of ethylene and propylene having the following composition: from 15% by weight to 80% by weight, more preferably from 20% by weight to 40% by weight, of ethylene; from 20% by weight to 85% by weight, more preferably from 60% by weight to 80% by weight, of propylene, with respect to the total weight of the elastomeric phase.

The amount of elastomeric phase present in the heterophase copolymer (b) may be determined by known techniques, for example by extracting the elastomeric (amorphous) phase with a suitable organic solvent (in particular xylene at 135° C. at reflux for 20 min): the amount of elastomeric phase is calculated as the difference between the initial weight of the sample and the weight of the dried residue.

The amount of propylene units in the elastomeric phase may be determined by extraction of the elastomeric phase as described above (for example with xylene at 135° C. at reflux for 20 min), followed by analysis of the dried extract according to known techniques, for example by infrared (IR) spectroscopy.

Examples of heterophase copolymers (b) which may be used in the present invention and which are currently commercially available are the products Hifax@ or Moplen® EP from Base11.

In the case of the homopolymer or copolymer (c), the "α-olefin" may also be, besides an aliphatic α-olefin of formula $CH_2=CH-R$ as defined above, an aromatic α-olefin of formula $CH_2=CH-R'$, wherein R' represents an aryl group having from 6 to 14 carbon atoms. Preferably, the aromatic α-olefin is selected from: styrene, α-methylstyrene, or mixtures thereof.

Preferably, the homopolymer or copolymer (c) which may be used in the present invention may be selected from:
propylene homopolymers or copolymer of propylene with ethylene and/or an α-olefin having from 4 to 12 carbon atoms with an overall content of ethylene and/or α-olefin lower than 10% by mole;
ethylene homopolymers or copolymers of ethylene with at least one α-olefin having from 4 to 12 carbon atoms;
styrene polymers such as, for example, styrene homopolymers; styrene homopolymers modified with a natural or synthetic elastomer such as, for example, polybutadiene, polyisoprene, butyl rubber, ethylene/propylene/diene copolymer (EPDM), ethylene/propylene copolymers (EPR) natural rubber, epichloridrin; styrene copolymers such as, for example, styrene-methylstyrene copolymer, styrene-isoprene copolymer or styrene-butadiene copolymer;

copolymers of ethylene with at least one ethylenically unsaturated ester selected from: alkyl acrylates, alkyl methacrylates and vinyl carboxylate, wherein the alkyl group, linear or branched, may have from 1 to 8, preferably from 1 to 4, carbon atoms, while the carboxylate group, linear or branched, may have from 2 to 8, preferably from 2 to 5, carbon atoms; and wherein the ethylenically unsaturated ester is generally present in an amount of from 0.1% to 80% by weight, preferably from 0.5% to 50% by weight, with respect to the total weight of the copolymer.

Examples of ethylene homopolymers or copolymers of ethylene with at least one α-olefin having from 4 to 12 carbon atoms which may be used in the present invention as homopolymer or copolymer (c) are: low density polyethylene (LDPE), medium density polyethylene (MDPE), high density polyethylene (HDPE), linear low density polyethylene (LLDPE), ultra-low density polyethylene (ULDPE), or mixtures thereof.

Preferably, the copolymers of ethylene with at least one α-olefin having from 4 to 12 carbon atoms may be selected from:

elastomeric copolymers having the following monomer composition: 35 mol %-90 mol % of ethylene; 10 mol %-65 mol % of an aliphatic α-olefin, preferably propylene; 0 mol %-10 mol % of a polyene, preferably a diene, more preferably, 1,4-hexadiene or 5-ethylene-2-norbornene (for example, EPR and EPDM rubbers);

copolymers having the following monomer composition: 75 mol %-97 mol %, preferably 90 mol %-95 mol %, of ethylene; 3 mol %-25 mol %, preferably 5 mol %-10 mol %, of an aliphatic α-olefin; 0 mol %-5 mol %, preferably 0 mol %-2 mol %, of a polyene, preferably a diene (for example, ethylene/1-octene copolymers, such as the products Engages of DuPont-Dow Elastomers).

Examples of styrene polymers which may be used in the present invention are: syndiotactic polystyrene, atactic polystyrene, isotactic polystyrene, polybutadiene-modified styrene polymer, styrene-butadiene copolymer, styrene-isoprene copolymer, or mixtures thereof.

With regard to the copolymers of ethylene with at least one ethylenically unsaturated ester, examples of acrylates or methacrylates are: ethyl acrylate, methyl acrylate, methyl methacrylate, t-butyl acrylate, n-butyl acrylate, n-butyl methacrylate, 2-ethylhexyl acrylate, or mixtures thereof. Examples of vinyl carboxylates are: vinyl acetate, vinyl propionate, vinyl butanoate, or mixtures thereof.

Examples of copolymers of ethylene with at least one ethylenically unsaturated ester which may be used in the present invention are: ethylene/vinylacetate copolymer (EVA), ethylene/ethylacrylate copolymer (EEA), ethylene/butylacrylate copolymer (EBA), or mixtures thereof.

When present, the homopolymer or copolymer (c) may be added to the thermoplastic material according to the present invention generally in an amount not lower than 5% by weight, preferably not lower than 10% by weight, with respect to the total weight of (a)+(b)+(c).

In order to improve the compatibility between the vulcanized rubber in a subdivided form (a) and the heterophase copolymer (b), the thermoplastic material according to the present invention further comprises at least one coupling agent (d).

It should to be noted that, in the case wherein the heterophase copolymer (b) has an elastomeric phase made from a copolymer of ethylene with propylene and the amount of propylene in said copolymer is at least 60% by weight, satisfactory mechanical properties are obtained even in the absence of said coupling agent (d).

The coupling agent (d) may be selected from those known in the art such as, for example: silane compounds containing at least one ethylenic unsaturation and at least one hydrolyzable group; epoxides containing at least one ethylenic unsaturation; monocarboxylic acids or, preferably, dicarboxylic acids having at least one ethylenic unsaturation, organic titanates, zirconates or aluminates; or derivatives thereof, in particular anhydrides or esters.

Examples of silane compounds which are suitable for this purpose are: γ-methacryloxypropyltrimethoxysilane, methyltriethoxysilane, methyltris(2-methoxyethoxy)silane, dimethyldiethoxysilane, vinyltris(2-methoxyethoxy)silane, vinyltrimethoxysilane, vinyltriethoxysilane, octyltriethoxysilane, isobutyltriethoxysilane, isobutyltrimethoxysilane, or mixtures thereof.

Examples of epoxides containing an ethylenic unsaturation are: glycidyl acrylate, glycidyl methacrylate, monoglycidyl ester of itaconic acid, glycidyl ester of maleic acid, vinyl glycidyl ether, allyl glycidyl ether, or mixtures thereof.

Monocarboxylic or dicarboxylic acids, having at least one ethylenic unsaturation, or derivatives thereof, which may be used as coupling agents are, for example: maleic acid, maleic anhydride, fumaric acid, citraconic acid, itaconic acid, acrylic acid, methacrylic acid and the like, and anhydrides or esters derived therefrom, or mixtures thereof. Maleic anhydride is particularly preferred.

Preferably, the coupling agent (d) may be added to the thermoplastic material according to the present invention in combination with at least one radical initiator (e) so as to graft the coupling agent directly onto the thermoplastic polymer. An organic peroxide such as, for example, t-butyl perbenzoate, dicumyl peroxide, benzoyl peroxide, di-t-butyl peroxide, or mixtures thereof may, for example, be used as a radical initiator (e).

The amount of coupling agent (d) which may be added to the thermoplastic material is, generally, of from 0.01% by weight to 10% by weight, preferably from 0.05% by weight to 5% by weight, with respect to 100 parts by weight of (a)+(b)+(c)

The amount of radical initiator (e) which may be added to the thermoplastic material is, generally, of from 0.01% by weight to 1% by weight, preferably from 0.05% by weight to 0.5% by weight, with respect to 100 parts by weight of (a)+(b)+(c).

The thermoplastic material according to the present invention may further comprises conventional additives such as lubricants, fillers, pigments, plasticizers, surface-modifying agents, UV absorbers, antioxidants, hindered amine or amide light stabilizers, or mixtures thereof.

Said thermoplastic material may be prepared by mixing the rubber vulcanized in a subdivided form (a) and the heterophase copolymer (b) with the other compound optionally present according to techniques known in the art. The mixing may be carried out, for example, using an open-mill mixer or an internal mixer of the type with tangential rotors (Banbury) or interlocking rotors (Intermix), or in continuous mixers of the Ko-Kneader type (Buss) or co-rotating or counter-rotating twin-screw type. The obtained thermoplastic material may then be extruded and pellettized according to usual techniques. The pellets may be either packaged for future use or used immediately in a process of forming a manufactured product. The pellets or blends of the present invention may be formed into manufactured products according techniques known in the art for thermal processing of thermoplastic resin compositions. For example, compression molding, vacuum molding, injection molding, calendering, casting, extrusion, filament winding, laminating, rotational or slush molding, transfer molding, lay-up or contact molding, stamping, or combinations of these methods, may be used.

The thermoplastic material according to the present invention may be formed into different kinds of manufactured products. In particular, the thermoplastic material according to the present invention may be formed into flooring and footpaths for recreational area; industrial, sport or safety surfaces; flooring tiles; anti-static computer mats; rubber mats and sheetings; mounting pads; shock absorbers sheetings; sound barriers; membrane protections; airfield runways or roadway surfaces; shoe soles; carpet underlay; automotive floor mats; automotive bumpers; automotive locary; automotive door or window seals; seals; o-rings; gaskets; watering systems; pipes or hoses materials; flower pots; building blocks; roofing materials; geomembranes; and the like.

The present invention will be further illustrated below by means of a number of preparation examples, which are given for purely indicative purposes and without any limitation of this invention.

EXAMPLES 1-8

Preparation of the Thermoplastic Materials

The thermoplastic materials given in Table 1 were prepared as follows.

All the ingredients were mixed together in an internal mixer (model Pomini PL 1. 6) for about 5 min. As soon as the temperature reached 190° C., a degassing step of 1 minutes was carried out, then the mixture was discharged. The obtained mixture was subsequently charged in an open roll mixer operating at a temperature of 150° C. in order to obtain a sheet 1 mm thick.

TABLE 1

| | EXAMPLE | | | | | | | |
|---|---|---|---|---|---|---|---|---|
| | 1 | 2 | 3 | 4 | 5 | 6(*) | 7(*) | 8(*) |
| Hifax ® CA10A[1] | 70 | 70 | — | 40 | 40 | — | — | — |
| Hifax ® 7320[1] | — | — | 70 | — | — | — | — | — |
| Moplen ® YD50G[1] | — | — | — | 30 | 30 | — | — | — |
| Moplen ® HP500N[1] | — | — | — | — | — | 80 | 60 | 80 |
| Orevac ® CA100[1] | — | — | — | — | — | — | 20 | — |
| Vulcanized rubber[2] | 30 | 30 | 30 | 30 | 30 | 20 | 20 | 20 |
| Maleic anhydride[2] | — | 2 | 2 | — | 2 | — | — | 4 |
| Peroximon ® DC/SC[2] | — | 0.2 | 0.2 | — | 0.2 | — | — | 0.5 |

(*)comparative;
[1]% by weight with respect to the total weight of (a) + (b) + (c);
[2]% by weight with respect to 100 parts by weight of (a) + (b) + (c);
Hifax ® CA10A: heterophase copolymer consisting of: 35% by weight of thermoplastic phase made from a propylene homopolymer; 65% by weight of elastomeric phase made from 28% by weight of ethylene and 72% by weight of propylene (Basell);
Hifax ® 7320: heterophase copolymer consisting of: 35% by weight of thermoplastic phase made from a propylene homopolymer; 65% by weight elastomeric phase made from 50% by weight of ethylene and 50% by weight of propylene (Basell);
Moplen ® YD50G[1]: polypropylene homopolymer (Basell);
Moplen ® HP500N[1]: polypropylene homopolymer (Basell);
Orevac ® CA100[1]: maleic anhydride functionalized polypropylene (0.9% maleic anhydride) (Atofina).
Vulcanized rubber[2]: mechanically ground rubber (<0.425 mm (40 mesh) – Somir);
Peroximon ® DC/SC[2]: dicumyl peroxide (Atofina).

Measurement of the Mechanical Characteristics

Plates 1 mm thick were formed from the thermoplastic material obtained as disclosed above. The plates were prepared by moulding for 10 minutes at 180° C. and subsequent cooling for 5 minutes to room temperature.

The plates were used for determining the mechanical characteristics (i.e. stress at break and elongation at break) according to ASTM standard D638-02a with the Instron instrument and at a traction speed of 50 mm/min. The obtained results are given in Table 2.

TABLE 2

| | EXAMPLE | | | | | | | |
|---|---|---|---|---|---|---|---|---|
| | 1 | 2 | 3 | 4 | 5 | 6(*) | 7(*) | 8(*) |
| Elongation at break (Mpa) | 245 | 396 | 109 | 162 | 238 | 21.3 | 20.4 | 20.9 |
| Stress at break (MPa) | 9.44 | 10.15 | 7.60 | 10.1 | 11.4 | 11 | 10 | 7 |

(*)comparative.

The data reported in Table 2 show that the thermoplastic material according to the present invention (Examples 1-5) has improved mechanical properties, in particular improved elongation at break, with respect to corresponding compositions devoid of the heterophase copolymer (b).

The invention claimed is:

1. A thermoplastic material comprising:
   (a) 5% by weight to 95% by weight of a vulcanized rubber in a subdivided form;
   (b) 5% by weight to 95% by weight of at least one heterophase copolymer comprising a thermoplastic phase made from a propylene homopolymer or copolymer and an elastomeric phase made from a copolymer of ethylene with an α-olefin; and
   (c) 0% by weight to 90% by weight of at least one α-olefin homopolymer or copolymer different from (b);
   the amounts of (a), (b) and (c) being expressed with respect to the total weight of (a)+(b)+(c).

2. The thermoplastic material according to claim 1, wherein the vulcanized rubber in a subdivided form (a) is present in an amount of 10% by weight to 60% by weight with respect to the total weight of (a)+(b)+(c).

3. The thermoplastic material according to claim 1, wherein the heterophase copolymer (b) is present in an amount of 40% by weight to 90% by weight with respect to the total weight of (a)+(b)+(c).

4. The thermoplastic material according to claim 1, wherein the α-olefin homopolymer or copolymer (c), is present in an amount of 0% by weight to 50% by weight with respect to the total weight of (a)+(b)+(c).

5. The thermoplastic material according to claim 1, wherein, the vulcanized rubber in a subdivided form (a) has a particle size not higher than 10 mm.

6. The thermoplastic material according to claim 5, wherein, the vulcanized rubber in a subdivided form (a) has a particle size not higher than 5 mm.

7. The thermoplastic material according to claim 1, wherein the vulcanized rubber in a subdivided form (a) has a particle size not higher than 0.6 mm.

8. The thermoplastic material according to claim 7, wherein the vulcanized rubber in a subdivided form (a) has a particle size not higher than 0.5 mm.

9. The thermoplastic material according to claim 8, wherein the vulcanized rubber in a subdivided form (a) has a particle size not higher than 0.2 mm.

10. The thermoplastic material according to claim 1, wherein the vulcanized rubber in a subdivided form (a) comprises at least one diene elastomeric polymer or copolymer of natural origin or obtained by solution polymerization, emulsion polymerization or gas-phase polymerization of one or more conjugated diolefins, optionally blended with at least one comonomer selected from monovinylarenes and/or polar comonomers in an amount of not more than 60% by weight.

11. The thermoplastic material according to claim 10, wherein the diene elastomeric polymer or copolymer is selected from: cis-1,4-polyisoprene, 3,4-polyisoprene, polybutadiene, optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

12. The thermoplastic material according to claim 1, wherein the vulcanized rubber in a subdivided form (a) comprises at least one elastomeric polymer of one or more monoolefins with an olefinic comonomer or derivatives thereof.

13. The thermoplastic material according to claim 12, wherein the elastomeric polymer is selected from: ethylene/propylene copolymers (EPH) or ethylene/propylene/diene copolymers (EPDM); polyisobutene; butyl rubbers; halobutyl rubbers, chlorobutyl or bromobutyl rubbers; or mixtures thereof.

14. The thermoplastic material according to claim 1, wherein the thermoplastic phase of the heterophase copolymer (b) comprises a propylene homopolymer or a copolymer of propylene with an olefinic comonomer selected from ethylene and α-olefins other than propylene.

15. The thermoplastic material according to claim 14, wherein the olefinic comonomer is ethylene.

16. The thermoplastic material according to claim 14, wherein the olefinic comonomer is less than 10 mol % relative to the total number of monomer moles in the thermoplastic phase.

17. The thermoplastic material according to claim 1, wherein the elastomeric phase of the heterophase copolymer (b) is at least 10% by weight relative to the total weight of the heterophase copolymer.

18. The thermoplastic material according to claim 17, wherein the elastomeric phase of the heterophase copolymer (b) is at least 40% by weight relative to the total weight of the heterophase copolymer.

19. The thermoplastic material according to claim 18, wherein the elastomeric phase of the heterophase copolymer (b) is at least 60% by weight relative to the total weight of the heterophase copolymer.

20. The thermoplastic material according to claim 1, wherein the elastomeric phase of the heterophase copolymer (b) comprises an elastomeric copolymer of ethylene with an α-olefin and optionally with a polyene.

21. The thermoplastic material according to claim 20, wherein the α-olefin is propylene.

22. The thermoplastic material according to claim 20, wherein the polyene is a diene selected from: linear (non-)conjugated diolefins; and monocyclic or polycyclic dienes.

23. The thermoplastic material according to claim 17, wherein the elastomeric phase has the following composition: 15 mol % to 85 mol % of ethylene; 85 mol % to 15 mol % of an α-olefin; and 0 mol % to 5 mol % of a diene.

24. The thermoplastic material according to claim 17, wherein the elastomeric phase comprises an elastomeric copolymer of ethylene and propylene having the following composition: 15% by weight to 80% by weight of ethylene; and 20% by weight to 85% by weight of propylene, with respect to the total weight of the elastomeric phase.

25. The thermoplastic material according to claim 24, wherein the elastomeric phase comprises an elastomeric copolymer of ethylene and propylene having the following composition: 20% by weight to 40% by weight of ethylene; and 60% by weight to 80% by weight of propylene, with respect to the total weight of the elastomeric phase.

26. Thermoplastic material according to claim 1, wherein in the α-olefin homopolymer or copolymer of (c), the α-olefin is an aliphatic α-olefin of formula $CH_2=CH-R'$, wherein R represents a hydrogen atom, a linear or branched alkyl group containing from 1 to 12 carbon atoms; or an aromatic α-olefin of formula $CH_2=CH-R'$, wherein R' represents an aryl group having from 6 to 14 carbon atoms.

27. Thermoplastic material according to claim 26, wherein the aliphatic α-olefin is selected from: ethylene, propylene, 1-butene, isobutylene, 1-pentene, 1-hexene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene, or mixtures thereof.

28. The thermoplastic material according to claim 26, wherein the aromatic α-olefin is selected from: styrene, and α-methylstyrene, or mixtures thereof.

29. The thermoplastic material according to claim 1, wherein in the α-olefin homopolymer or copolymer (c), the polyene is a conjugated or non-conjugated diene, triene or tetraene.

30. The thermoplastic material according to claim 1, wherein the α-olefin homopolymer or copolymer (c) is selected from:
   propylene homopolymers or copolymer of propylene with ethylene and/or an α-olefin having 4 to 12 carbon atoms with an overall content of ethylene and/or α-olefin lower than 10% by mole;
   ethylene homopolymers or copolymers of ethylene with at least one α-olefin having 4 to 12 carbon atoms;
   styrene polymers such as styrene homopolymers;
   styrene homopolymers modified with a natural or synthetic elastomer, polybutadiene, polyisoprene, butyl rubber, ethylene/propylene/diene copolymer (EPDM), ethylene/propylene copolymers (EPR), natural rubber, epichloridrin; styrene copolymers, styrene-methylstyrene copolymer, styrene-isoprene copolymers, or styrene-butadiene copolymer; and
   copolymers of ethylene with at least one ethylenically unsaturated ester selected from: alkyl acrylates, alkyl methacrylates and vinyl carboxylate, wherein the alkyl group, linear or branched, has 1 to 8 carbon atoms, while the carboxylate group, linear or branched, has 2 to 8 carbon atoms; and wherein the ethylenically unsaturated ester is generally present in an amount of 0.1% to 80% by weight with respect to the total weight of the copolymer.

31. The thermoplastic material according to claim 30, wherein the ethylene, homopolymers or copolymers of ethylene with at least one α-olefin having 4 to 12 carbon atoms are selected from: low density polyethylene (LDPE), medium density polyethylene (MDPE), high density polyethylene (HDPE), linear low density polyethylene (LLDPE), and ultra-low density polyethylene (ULDPE), or mixtures thereof.

32. The thermoplastic material according to claim 30, wherein the styrene polymers are: syndiotactic polystyrene, atactic polystyrene, isotactic polystyrene, polybutadiene-modified styrene polymer, styrene-butadiene copolymer, and styrene-isoprene, or mixtures thereof.

33. The thermoplastic material according to claim 30, wherein the copolymers of ethylene with at least one α-olefin having 4 to 12 carbon atoms are selected from:
   elastomeric copolymers having the following monomer composition: 35 mol %-90 mol % of ethylene; 10 mol %-65 mol % of an aliphatic α-olefin; and 0 mol %-10 mol % of a polyene; and
   copolymers having the following monomer composition: 75 mol %-97 mol % of ethylene; 3 mol %-25 mol % of an aliphatic α-olefin; and 0 mol %-5 mol % of a polyene.

34. The thermoplastic material according to claim 30, wherein the copolymers of ethylene with at least one ethylenically unsaturated ester are selected from: ethylene/vinylacetate copolymer (EVA), ethylene/ethylacrylate copolymer (EEA), and ethylene/butylacrylate copolymer (EBA), or mixtures thereof.

35. The thermoplastic material according to claim 1, wherein the homopolymer or copolymer (c) is present in an amount not lower than 5% by weight with respect to the total weight of (a)+(b)+(c).

36. The thermoplastic material according to claim 35, wherein the homopolymer or copolymer (c) is present in an amount not lower than 10% by weight with respect to the total weight of (a)+(b)+(c).

37. The thermoplastic material according to claim 1, further comprising at least one coupling agent (d).

38. The thermoplastic material according to claim 37, wherein the coupling agent (d) is selected from: silane compounds containing at least one ethylenic unsaturation and at least one hydrolyzable group; epoxides containing at least one ethylenic unsaturation; monocarboxylic acids, dicarboxylic acids having at least one ethylenic unsaturation, organic titanates, zirconates or aluminates; or derivatives thereof.

39. The thermoplastic material according to claim 37, wherein the coupling agent (d) is added in an amount of 0.01% by weight to 10% by weight with respect to 100 parts by weight of (a)+(b)+(c).

40. The thermoplastic material according to claim 37, further comprising a radical initiator (e).

41. The thermoplastic material according to claim 40, wherein the radical initiator is an organic peroxide selected from: t-butyl perbenzoate, dicumyl peroxide, benzoyl peroxide, di-t-butyl peroxide, or mixtures thereof.

42. The thermoplastic material according to claim 40, wherein the radical initiator (e) is present in an amount of 0.01% by weight to 1% by weight, with respect to 100 parts by weight of (a)+(b)+(c).

43. A manufactured product comprising a thermoplastic material according to claim 1.

44. The manufactured product according to claim 43, wherein said manufactured product is selected from: flooring for recreational areas: flooring tiles; sound barriers; shoe soles; automotive floor mats; automotive bumpers; wheel arch liner; pipe or hose materials; roofing materials; and geomembranes.

* * * * *